No. 622,057. Patented Mar. 28, 1899.
E. A. MATHIAS.
ANIMAL TRAP.
(Application filed Apr. 29, 1898.)

(No Model.)

Witnesses
H. J. Lazarre
Harry L. Amer.

Inventor
Elsworth A. Mathias.
by W. S. Stockbridge.
his Attorney.

United States Patent Office.

ELSWORTH ANTHONY MATHIAS, OF CALEDONIA, OHIO.

ANIMAL-TRAP.

SPECIFICATION forming part of Letters Patent No. 622,057, dated March 28, 1899.

Application filed April 29, 1898. Serial No. 679,221. (No model.)

*To all whom it may concern:*

Be it known that I, ELSWORTH ANTHONY MATHIAS, a citizen of the United States, residing at Caledonia, in the county of Marion and State of Ohio, have invented certain new and useful Improvements in Animal-Traps; and I do hereby declare the following to be a full, clear, and exact description of the invention, such as will enable others skilled in the art to which it appertains to make and use the same.

My invention relates to animal-traps, the object of the same being to provide a simple and cheaply-constructed device especially adapted for use as a rat-trap, by means of which the rat is induced to enter the cage or receptacle and is afterward securely retained therein.

The invention consists of a cage or receptacle having a passage-way formed therein leading to the bait-receptacle, a pivotally-mounted incline in said passage-way, and a door connected to the inner end of said incline and made up of two pivoted sections adapted to close the opening leading into the cage when the parts are in their normal positions.

The invention also consists in certain details of construction and combinations of parts, which will be hereinafter more fully described and claimed.

Figure 1:
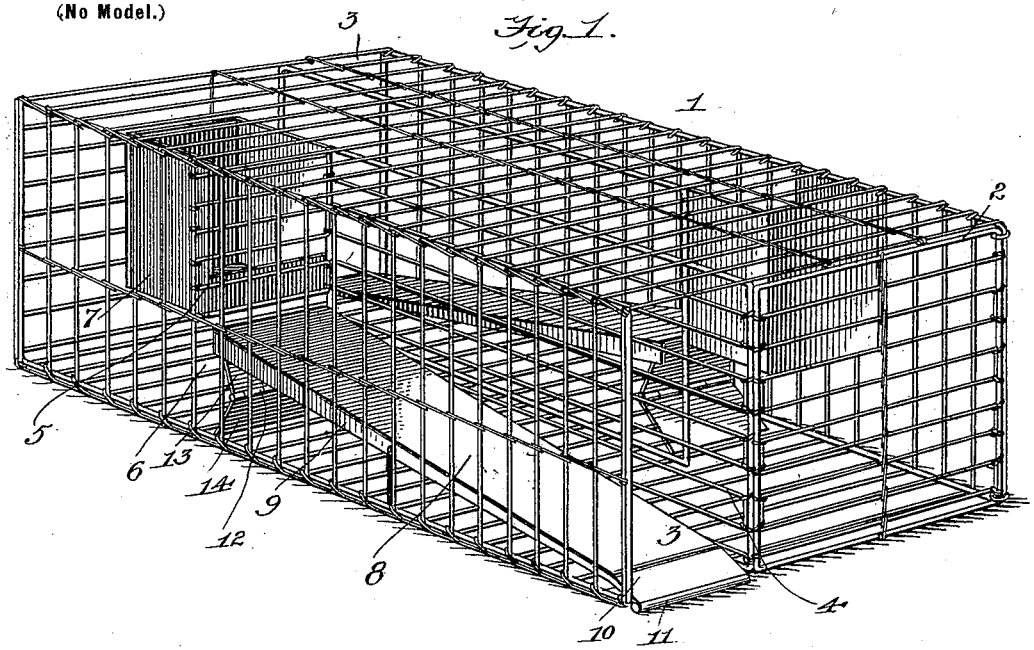
Figure 2:
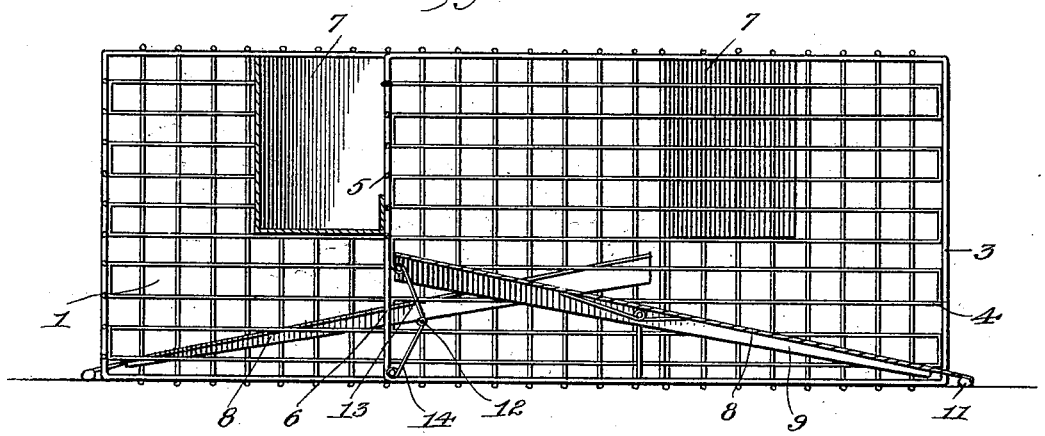
Figure 3:
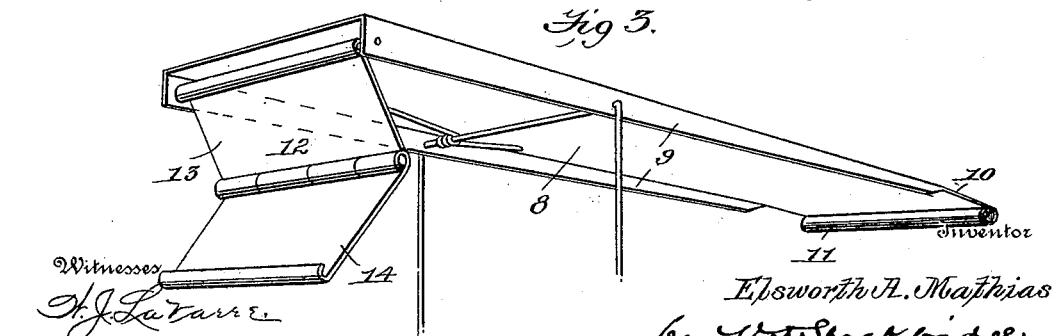

In the drawings forming a part of this specification, Figure 1 represents a perspective view of a trap constructed according to my invention. Fig. 2 is a vertical longitudinal section of the trap, taken through one of the passage-ways; and Fig. 3 is a perspective view of one of the inclines and the parts connected thereto.

Like reference-numerals indicate like parts in the several views.

My trap is made up of a cage 1, constructed of interlaced wires or other open-work, having a door 2 at one end leading into the compartment for holding the rats or other animals after they have been entrapped, the said door being provided with suitable mechanism whereby it may be locked in its closed position. Upon each side of the cage is formed a passage-way 3 by means of longitudinally-extending partitions 4 and transverse partitions 5, connecting the sides of the cage 1 and the partitions 4 and extending from a point adjacent to the vertical center of the cage upwardly, leaving a space or opening 6 beneath said transverse partitions.

As the passage-ways 3 and the parts operating in connection therewith are identical upon both sides of the trap, but one will be described. Just in the rear of the transverse partition 5 is a bait-box 7, the same being of any approved form and construction. Located within the passage-way 3 and pivotally mounted at a point intermediate of its ends is an incline 8, having flanges 9 9 upon the sides thereof and an inclined or beveled portion 10 at its outer end. The said incline 8 is located normally in the position shown in Fig. 1 of the drawings, wherein the upper inner end thereof lies in line with the lower end of the partition 5, the same being held in such position by a weight 11 upon the outer free end thereof, as clearly shown. Instead of this weight the said incline may be held in the position described by locating its pivotal point nearer the inner end thereof than the outer, or springs might be provided for holding said incline in the position shown.

Pivotally connected to the inner end of the incline 8 is a door 12, the same being made up of two pivoted sections 13 14, the lower section 14 being in turn pivoted to the bottom of the cage 1 adjacent to the opening 6 beneath the transverse partition 5. The said sectional door is adapted to completely close the opening 6 when the incline 8 is in its normal position, so as to prevent the escape of the animal from the under side of the incline. As said door is made in sections, however, it is capable of being opened by applying pressure upon the upper end thereof.

The operation of the device, it is thought, will be readily understood from the preceding description; but it may be briefly stated as follows: With the parts in the position shown in the drawings, the bait being inserted in the box 7, the rat or other animal is induced to walk up the incline 8, which leads to the said bait-box. Before reaching the box, however, his weight will overbalance the weight 11 upon the outer end of the incline and depress the inner end of said incline, which action will uncover the opening 6 by folding the sectional door 12 and conduct the animal forcibly into the main receptacle on the interior of the cage.

The egress of the animal, as heretofore stated, is effectually prevented by the sectional door 12, which is returned to its normal position by the weight, spring, or other mechanism which is employed for holding the outer end of the incline 8 downwardly.

Having thus described the invention, what is claimed as new is—

1. An animal-trap comprising a cage having an opening leading to the interior thereof, a pivotally-mounted incline whose upper end lies adjacent to said opening, and a folding door connected to said incline and adapted to close said opening.

2. An animal-trap comprising a cage having an opening leading to the interior thereof, a pivotally-mounted incline whose upper end lies adjacent to said opening, and a door made up of hinged sections, the upper of which is pivotally connected to said incline and the lower of which to said cage, the said door being adapted to close said opening when the incline is in its normal position.

3. An animal-trap comprising a cage having a passage-way therein, formed by a longitudinal partition and a transverse partition, the latter terminating a short distance from the bottom of the cage, a pivotally-mounted incline in said passage-way, a weight upon the outer end thereof for normally holding the inner end thereof in raised position adjacent to the lower end of said transverse partition, and a door made up of pivoted sections adapted to close the opening beneath the transverse partition, the upper of said sections being pivoted to the inner end of said incline and the lower of said sections to said cage, as and for the purpose set forth.

In testimony whereof I affix my signature in presence of two witnesses.

ELSWORTH ANTHONY MATHIAS.

Witnesses:
C. E. KELLY,
CHALMERS KELLY.